(12) United States Patent
Hadi et al.

(10) Patent No.: US 7,898,400 B2
(45) Date of Patent: Mar. 1, 2011

(54) ENHANCED VISION ROAD DETECTION SYSTEM

(75) Inventors: Salah Hadi, Linköping (SE); Stephen Decker, Auburn Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 357 days.

(21) Appl. No.: 12/103,630

(22) Filed: Apr. 15, 2008

(65) Prior Publication Data

US 2009/0256692 A1 Oct. 15, 2009

(51) Int. Cl.
*B60Q 1/00* (2006.01)
(52) U.S. Cl. .................. 340/435; 340/446; 340/475
(58) Field of Classification Search ................. 340/435, 340/436–439, 441, 446–448, 460–466, 467, 340/474–475
See application file for complete search history.

(56) References Cited

U.S. PATENT DOCUMENTS

| | | | |
|---|---|---|---|
| 5,410,346 A | 4/1995 | Saneyoshi et al. | |
| 5,541,590 A | 7/1996 | Nishio | |
| 5,555,312 A | 9/1996 | Shima et al. | |
| 5,761,326 A | 6/1998 | Brady et al. | |
| 5,767,922 A | 6/1998 | Zabih et al. | |
| 5,845,000 A | 12/1998 | Breed et al. | |
| 5,913,375 A | 6/1999 | Nishikawa | |
| 5,963,653 A | 10/1999 | McNary et al. | |
| 5,987,174 A * | 11/1999 | Nakamura et al. | 382/199 |
| 6,674,394 B1 | 1/2004 | Zoratti | |
| 6,801,662 B1 | 10/2004 | Owechko et al. | |
| 6,826,468 B2 * | 11/2004 | Williams | 701/70 |
| 6,838,980 B2 | 1/2005 | Gloger et al. | |
| 2002/0095246 A1 * | 7/2002 | Kawazoe | 701/1 |
| 2003/0025597 A1 | 2/2003 | Schofield | |
| 2003/0149530 A1 | 8/2003 | Stopczynski | |
| 2003/0156015 A1 | 8/2003 | Winner et al. | |
| 2003/0179084 A1 | 9/2003 | Skrbina et al. | |
| 2003/0195667 A1 | 10/2003 | Tange et al. | |
| 2004/0016870 A1 | 1/2004 | Pawlicki et al. | |
| 2004/0098197 A1 | 5/2004 | Matsumoto et al. | |
| 2004/0107033 A1 | 6/2004 | Rao et al. | |
| 2004/0183663 A1 * | 9/2004 | Shimakage | 340/436 |
| 2004/0233051 A1 | 11/2004 | Madau | |
| 2007/0091173 A1 * | 4/2007 | Kade et al. | 348/119 |
| 2007/0152803 A1 | 7/2007 | Huang et al. | |
| 2007/0255474 A1 | 11/2007 | Hayakawa et al. | |
| 2008/0049975 A1 | 2/2008 | Stiegler | |

FOREIGN PATENT DOCUMENTS

DE 199 61 799 A1 7/2001

OTHER PUBLICATIONS

Notification Of Transmittal Of The International Search Report And The Written Opinion Of The International Searching Authority, Or The Declaration, International Application No. PCT/US09/40571, Dated May 26, 2009.

(Continued)

*Primary Examiner*—Daniel Previl
(74) *Attorney, Agent, or Firm*—Sally J Brown; Brinks Hofer Gilson & Lione

(57) ABSTRACT

A system for determining when a vehicle is departing from the current lane. The system includes a processor, an imaging sensor, and an inertial sensor assembly. The imaging sensor is in electrical communication with the processor to provide a vehicle position signal and a preceding lane structure. The inertial sensor assembly is in electrical communication with processor to provide acceleration and rotational information about the vehicle. Based on a combination of the vehicle position, the preceding lane structure, the acceleration information, and the rotational information, the processor generates a warning signal to alert the driver.

23 Claims, 3 Drawing Sheets

OTHER PUBLICATIONS

C. Coué, Th. Fraichard, P. Bessièand E. Mazer, Inria Rhōne-Alpes & Gravir—CNRS, "*Using Bayesian Programming for Multi-Sensor Multi-Target Trackign in Automotive Applications*", Proceedings of the 2003 IEEE International Conference on Robotics and Automation, Taipei, Taiwan, Sep. 14-19, 2003, pp. 2104-2109.

Notification of Transmittal of the International Search Report and the Written Opinion of the International Searching Authority, or the Declaration for International Application No. PCT/US09/40570, Dated Sep. 23, 2009.

* cited by examiner

ENHANCED VISION ROAD DETECTION SYSTEM

FIELD OF THE INVENTION

This invention relates to a system for sensing when a motor vehicle is departing from the current lane.

BACKGROUND OF THE INVENTION

Enhancements in automotive sensing systems over the past several decades have provided dramatic improvements in vehicle occupant protection. Presently available motor vehicles include an array of such systems, including object detection systems that sense vehicles or other objects behind and adjacent to the vehicle. Further, object detection systems for the front of the vehicle have been used for crash avoidance systems and speed control systems that allow the following of preceding vehicles. However, these systems are generally designed to detect and classify objects that may enter a region around the vehicle. These systems do not inform the driver if the vehicle is departing from the road or current lane inadvertently.

Some systems are under development that do detect lane departure. However, these systems are typically unreliable. Such systems often use a vision sensor to detect lane demarcations on a road surface. However, if the vision sensor is unable to clearly detect the lane demarcations the system may improperly indicate a lane departure. If lane departures are falsely detected the driver will eventually ignore any warning from the lane departure system, thereby limiting its effectiveness. In addition, customer satisfaction with the system will decline, impacting the customer's overall satisfaction with the vehicle.

It is apparent from the discussion above that there is a need for an improved system for sensing when a motor vehicle is departing from the current lane.

SUMMARY OF THE INVENTION

In satisfying the above need, as well as overcoming the drawbacks and other limitations of the related art, the present invention provides an improved system for determining when a vehicle is departing from the current lane.

The system includes a processor, an imaging sensor, and an inertial sensor assembly. The imaging sensor is in electrical communication with the processor to provide a vehicle position signal and a preceding lane structure. The vehicle position signal corresponds to the vehicle position relative to the lane and the preceding lane structure corresponding to the direction of the lane in front of the vehicle. The inertial sensor assembly is in electrical communication with the processor to provide inertial information about the vehicle. The inertial sensor assembly generates a yaw signal and a roll signal that correspond respectively to a yaw angle change and roll angle change of the vehicle. The inertial sensor assembly also generates a lateral acceleration signal and a longitudinal acceleration signal for the vehicle. Based on a combination of the vehicle position, the preceding road structure, the yaw signal, the roll signal, the longitudinal acceleration signal, and the lateral acceleration signal, the processor generates a lane departure signal.

In another aspect of the invention, the inertial sensor assembly may include multiple accelerometers. Further, the inertial sensor assembly may also generate a vertical acceleration signal and a pitch signal corresponding respectively to the vertical acceleration and pitch angle of the vehicle.

In another aspect of the invention, the processor generates a warning signal to initiate a visual or audio alert that notifies the driver when a lane departure is detected.

In yet another aspect of the present invention, the processor generates a vehicle dynamics status based on the yaw signal, the roll signal, the longitudinal acceleration signal, and the lateral acceleration signal. The processor compares the preceding lane structure to the vehicle dynamics status to predict if a hazardous vehicle motion is required to follow the preceding lane structure. The processor generates an alert to the driver or controls a vehicle safety system based on the hazardous motion status.

By sensing and notifying the safety system of a lane departure or imminent lane departure, the sensing system enables the safety system to prepare for a possible collision condition or evasive maneuver. The safety system can tighten the seat belts by activating an electric pre-tensioner, which makes the seat belt system more effective at restraining the occupant during a collision, and during the deceleration force of the crash. The advanced warning of a frontal crash can also be used to inflate a larger airbag at a much slower rate. The slower rate would reduce the potential of injury by the inflating airbag, and the larger size would offer a higher level of potential energy absorption to the occupant, compared to a smaller bag. Other advantages of an early warning system include the ability to deploy additional structures or modify existing structures to maximize occupant safety. These structures could be expanding bumpers, additional frame rails or pressurized body components that would add a level of safety just prior to impact during a crash.

Additional time to deploy enables control of safety devices that respond slowly in comparison to today's airbags. The seating position and headrest position can be modified, based on advanced crash information to increase their effectiveness in a variety of crash scenarios. Electric knee bolster extenders can be enabled to help hold the occupant in position during a crash. Advance warning also enables the windows and sunroof to close to further increase crash safety. External structures can be modified with advance notice of an impending crash. Structures such as extendable bumpers and external airbags can be deployed to further reduce the crash forces transmitted to the vehicle's occupants.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION

Figure 1:
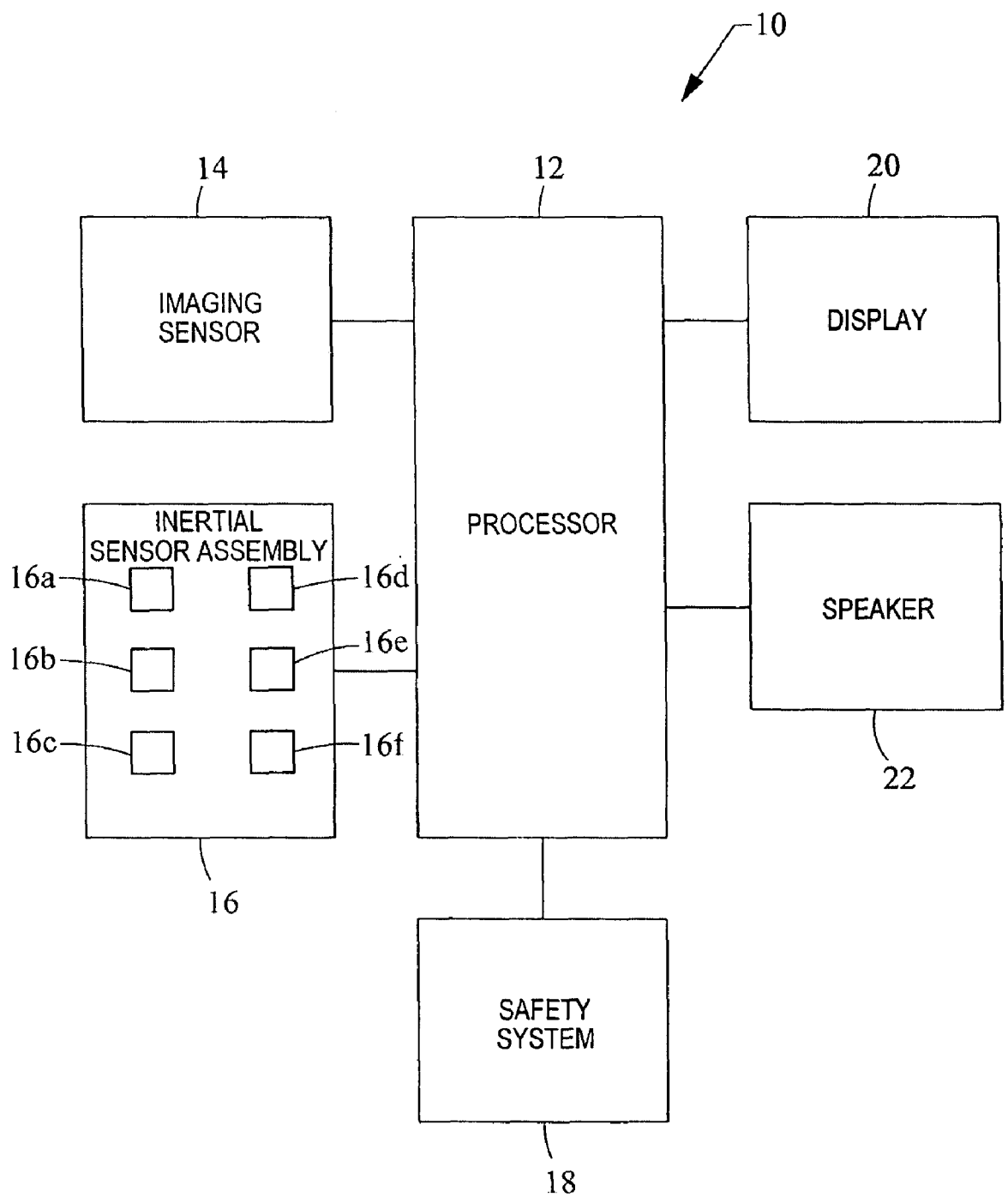
FIG. 1 is schematic view of a sensing system for detecting when a vehicle is departing from a current lane.

Referring now to FIG. 1, a system embodying the principles of the present invention is illustrated therein and designated at 10. As its primary components, the system 10 includes a processor 12, an imaging sensor 14, and an inertial sensor assembly 16.

The imaging sensor 14 is in electrical communication with the processor 12 and is configured to receive image data representing a view of the lane in front of the vehicle. Accordingly, the imaging sensor 14 may be oriented to view the lane in front of the vehicle and has a field of view such that the road is visible between about 1 and 40 yards in front of the vehicle. Accordingly, the processor 12 may manipulate the image data, for example by applying an edge enhancement algorithm and segmenting the results of the edge enhancement algorithm to identify lane demarcations on the road. Once the lane demarcations are identified, the position of the imaging sensor 14 is determined and from this relationship a position of the vehicle relative to the lane may be determined. In addition, the lane demarcations may be used to project the preceding lane structure in front of the vehicle. For example, as lane demarcations on the left and right and side of the vehicle veer in one direction, the processor 12 may determine that the lane curvature may be located in front of the vehicle. The severity of the curvature may be determined based on the projection of the lane demarcations identified by the processor 12. Further, it is also possible to determine whether the preceding lane structure of the road is oriented uphill or downhill based on the widening or narrowing of the distance between the left and right lane demarcations. The relationship of the imaging sensor 14 and the lane demarcations can be seen in FIG. 2, where the lane demarcations are denoted by reference numeral 25.

Figure 3:
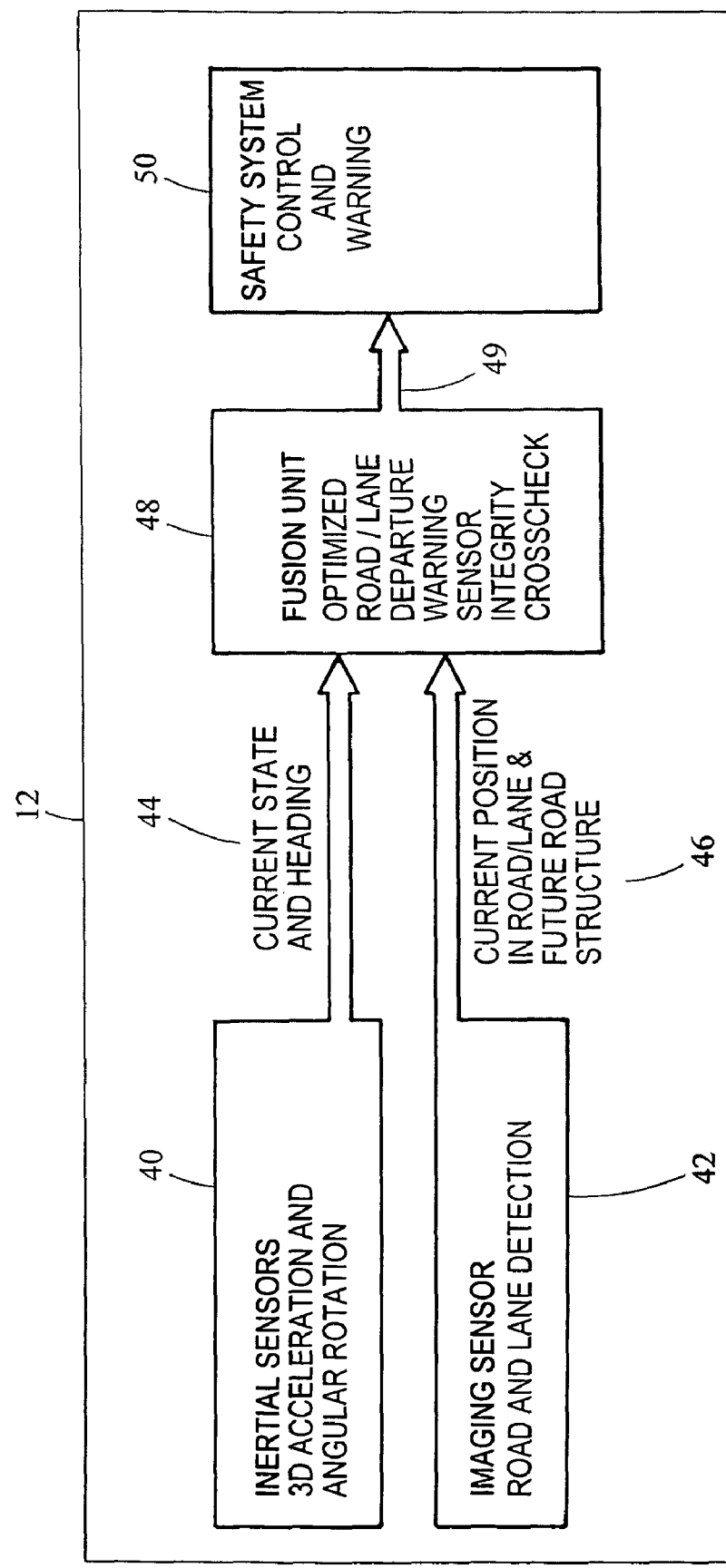
FIG. 3 is schematic view of the algorithm for processing data from the imaging sensor and inertial sensor assembly.

Now referring FIG. 3, the imaging sensor algorithm 42 performed by the processor 12 may receive data from the imaging sensor 14. The imaging sensor algorithm 42 calculates data 46 representing the relative position of the vehicle and the preceding lane structure that is provided to the fusion algorithm unit 48. The fusion algorithm unit 48 is configured to optimize the lane departure warning decision and cross-check the integrity of the sensor data.

Referring again to FIG. 1, the inertial sensor assembly 16 is also in electrical communication with processor 12. The inertial sensor assembly 16 is configured to determine the vehicle dynamic status and heading of the vehicle. In one embodiment, the inertial sensor assembly 16 may include multiple accelerometers configured to determine the longitudinal acceleration, the lateral acceleration, and the vertical acceleration of the vehicle. Accordingly, the inertial sensor assembly 16 is configured to generate a longitudinal acceleration signal, a lateral acceleration signal, and a vertical acceleration signal corresponding respectively to the longitudinal, lateral, and vertical acceleration of the vehicle.

Figure 2:
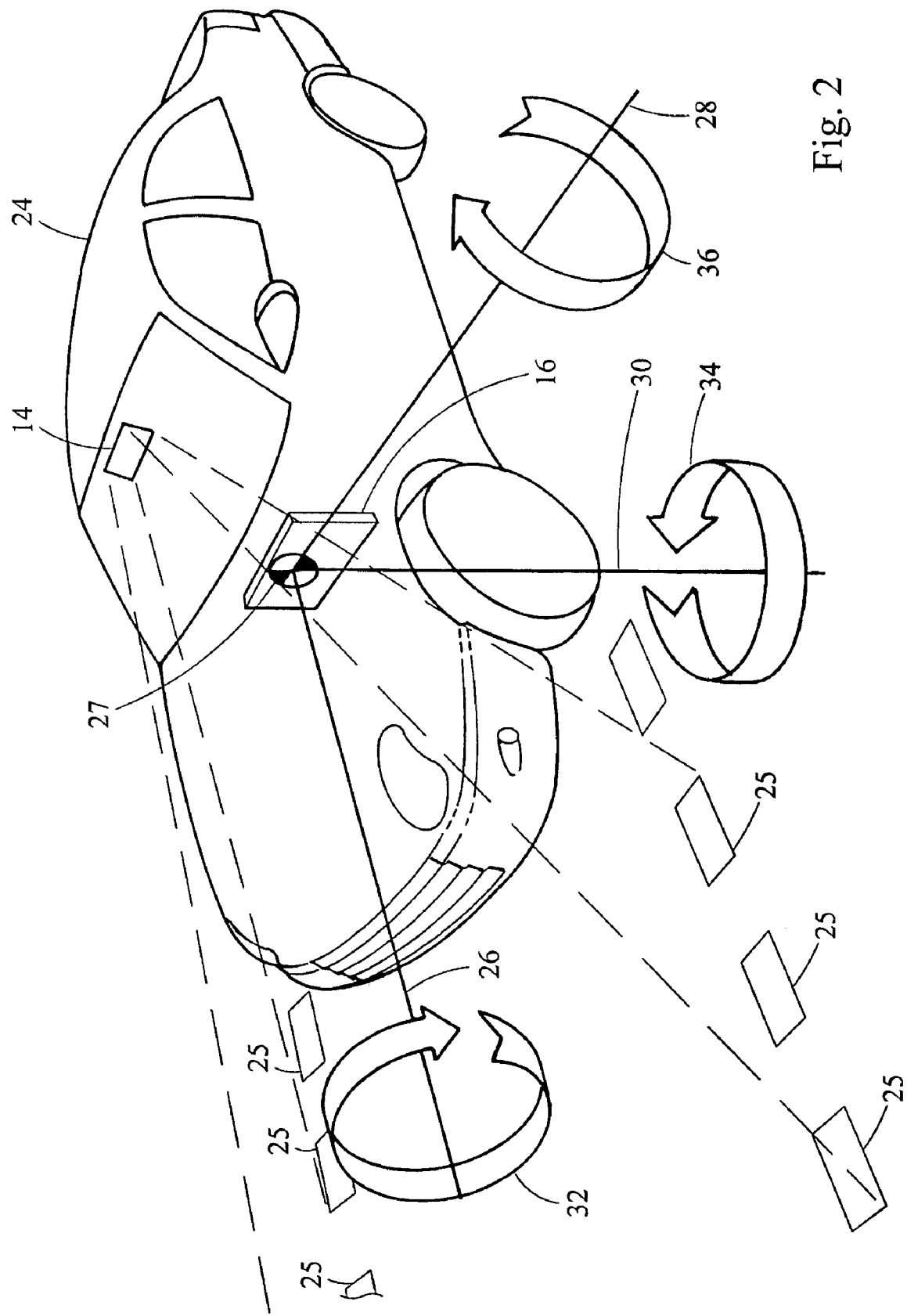
FIG. 2 is a schematic view of a vehicle carrying the sensing system of FIG. 1.

As seen in FIG. 2, the longitudinal axis 26 of the vehicle 24 extends from the rear to the front of the vehicle 24 through the vehicle's center of gravity 27. The roll angle 32 of the vehicle 24 is defined by the vehicle's rotation about the longitudinal axis 26. The lateral axis 28 of the vehicle 24 extends from the left to the right of the vehicle 24 through the vehicle's center of gravity 27. The pitch angle 36 of the vehicle 24 is defined by the vehicle's rotation about the lateral axis 36. Likewise, the vertical axis 30 of the vehicle extends from the top to the bottom of the vehicle through the vehicle's center of gravity 27. The yaw angle 34 of the vehicle is defined by the vehicle's rotation about the vertical axis 30. It is further noted that the coordinate system provided above is only exemplary and one of ordinary skill in the art could define the coordinate system differently depending on the vehicle.

Referring again to FIG. 1, the inertial sensor assembly 16 or processor 12 may be further configured to generate the yaw signal, roll signal, and pitch signal based on the rate of change of the yaw pitch or roll angle, although it is understood that the signals may also be generated based on absolute angles or a change in angle. According to one example, the inertial sensor assembly 16 may include a pair of longitudinal accelerometers 16a, 16b in spaced relationship along the lateral axis such that the difference between the first accelerometer 16a and the second accelerometer 16b may be used to calculate the yaw angle of the vehicle by the processor 12. Similarly, the inertial sensor assembly 16 may include a pair of lateral accelerometers 16c, 16d in spaced relationship along the vertical axis such that the difference between the first accelerometer 16c and the second accelerometer 16d may be used to calculate the roll angle of the vehicle by the processor 12. Likewise, a pair of vertical accelerometers 16e, 16f may be located in spaced relationship along the longitudinal axis such that the difference between the first accelerometer 16e and the second accelerometer 16f may be used to calculate the pitch angle of the vehicle by the processor 12.

Accordingly, the processor 12 may receive data from the inertial sensor assembly 16 including but not limited to the longitudinal acceleration signal, the lateral acceleration signal, and the vertical acceleration signal, as well as, the yaw signal, the roll signal, and the pitch signal. The processor 12 may calculate a vehicle heading and vehicle dynamics status based on the data from the inertial sensor assembly 16.

The acceleration and angular rotation data from the inertial sensor assembly 16 is received into an inertial sensor processing algorithm 40 of the processor 12, as shown in FIG. 3. The inertial sensor processing algorithm 40 may pre-process the raw accelerometer data for example by averaging or confirming sensor measurements based on a cross-comparison of the data. The inertial sensor processing algorithm 40 then calculates a heading and a vehicle dynamic status 44 of the vehicle which may then be provided fusion algorithm unit 48. The fusion algorithm unit 48 combines the vehicle dynamics status and heading information 44 from the inertial sensor algorithm 40 with the current position and preceding lane structure information 46 from the imaging sensor algorithm 42 to determine if the vehicle has departed from the lane and/or predict if the vehicle will be departing from the lane, and/or if a hazardous vehicle motion status exists. In one example, the fusion algorithm 48 may use the heading information based on inputs such as the longitudinal acceleration signal, the lateral acceleration signal, the yaw signal and the roll signal in combination with the road position to determine if the vehicle has departed from the lane. Further, this information may be used in conjunction with the preceding lane structure information to predict if the vehicle will immediately depart from the lane within the near future. In addition, the fusion unit may further use the vehicle dynamic status along with any of the aforementioned data to determine how the vehicle will react to a predicted change in heading that would be required to follow the preceding lane structure. If the change in heading would require a hazardous vehicle motion the processor 12 determines a hazardous vehicle motion status exists and generates a vehicle motion signal. Accordingly, warning data 49 including, for example, a lane departure signal, a predicted lane departure signal, and/or a hazardous vehicle motion signal is provided to the safety system control and warning algorithm 50. The safety system control and warning algorithm 50 interface with devices external to the processor 12 to alert the user of the vehicle or other vehicle sub-systems of the warning condition.

As such, the processor 12 is in communication with a display device 20 configured to provide a visual alert to the user that a warning condition has occurred. The visual alert may take the form of flashing indicator, for example an LED or a message on the system display. Further, the processor 12 may be in communication with a speaker 22 configured to provide audible alert to the user based on the warning condition. The audible alert may include varying tones or volume based on severity of the warning condition. For example, a different tone may be provided upon a lane departure, a predicted lane departure, and/or a hazardous vehicle motion condition. Further, the tone or volume may vary in real-time, for example, the volume may get louder or the tone higher as the vehicle lane departure becomes more imminent.

The processor 12 also be in communication with a vehicle safety system 18 to control the vehicle safety system 18 based on the warning condition. In one example, the vehicle, be it restraints, may pretension if a hazardous vehicle motion condition is present. Although, other safety system control has been discussed herein, it is understood that any known or future safety system may be controlled based on any of the warning conditions, including the lane departure signal, the predicted lane departure signal, and the hazardous vehicle motion condition. For example, such safety systems may prepare for a possible collision condition or evasive maneuver. The safety system can tighten the seat belts by activating an electric pre-tensioner, which makes the seat belt system more effective at restraining the occupant during a collision, and during the deceleration force of the crash. The advanced warning of a frontal crash can also be used to inflate a larger airbag at a much slower rate. The slower rate would reduce the potential of injury by the inflating airbag, and the larger size would offer a higher level of potential energy absorption to the occupant, compared to a smaller bag. Other advantages of an early warning system include the ability to deploy additional structures or modify existing structures to maximize occupant safety. These structures could be expanding bumpers, additional frame rails or pressurized body components that would add a level of safety just prior to impact during a crash.

Additional time to deploy enables control of safety devices that respond slowly in comparison to today's airbags. The seating position and headrest position can be modified, based on advanced crash information to increase their effectiveness in a variety of crash scenarios. Electric knee bolster extenders can be enabled to help hold the occupant in position during a crash. Advance warning also enables the windows and sunroof to close to further increase crash safety. External structures can be modified with advance notice of an impending crash. Structures such as extendable bumpers and external airbags can be deployed to further reduce the crash forces transmitted to the vehicle's occupants.

Further, it is also to be noted that the fusion algorithm unit may supplement the current state and heading information 44 and the current position and preceding lane structure information 46 with additional information including but not limited to the steering wheel angle, vehicle speed, the rate of change of the steering wheel angle, throttle position, and braking information, which is readily available from other vehicle sub-systems.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A system for detecting departure of a vehicle from a lane on a road, the system comprising:
    a processor;
    an imaging sensor in electrical communication with the processor, the imaging sensor generating a vehicle position signal corresponding to the vehicle position relative to the lane and a preceding lane structure corresponding to a direction of the lane in front of the vehicle;
    an inertial sensor assembly in electrical communication with the processor, the inertial sensor assembly generating a yaw signal and roll signal corresponding to a yaw angle and roll angle of the vehicle, the inertial sensor assembly generating a lateral acceleration signal corresponding to a lateral acceleration of the vehicle;
    wherein the lateral acceleration signal, the yaw signal and the roll signal from the inertial sensor assembly are used in conjunction with preceding lane structure information from the imaging sensor to predict departure from the lane.

2. The system according to claim 1, wherein the inertial sensor assembly generates a longitudinal acceleration signal corresponding to a longitudinal acceleration of the vehicle.

3. The system according to claim 2, wherein the inertial sensor assembly comprises a plurality of accelerometers configured to generate the yaw signal, the roll signal, the longitudinal acceleration signal, and the lateral acceleration signal.

4. The system according to claim 1, wherein the processor is configured to generate a warning signal to alert a vehicle driver when a lane departure is detected.

5. The system according to claim 4, further comprising a speaker wherein the warning signal is provided to the speaker to generate an audible alert.

6. The system according to claim 4, further comprising a display wherein the warning signal is provided to the display to generate a visual alert.

7. The system according to claim 1, wherein the processor generates a vehicle dynamics status based on the yaw signal, the roll signal, the longitudinal acceleration signal, and the lateral acceleration signal.

8. The system according to claim 7, wherein the inertial sensor assembly generates a vertical acceleration signal and the processor generates the vehicle dynamics status based on the vertical acceleration signal.

9. The system according to claim 8, wherein the inertial sensor assembly generates a pitch signal and the processor generates the vehicle dynamics status based on the pitch signal.

10. The system according to claim 7, wherein the processor compares the preceding lane structure to the vehicle dynamics to predict a hazardous vehicle motion status.

11. The system according to claim 10, wherein the processor generates a predicted vehicle motion alert based on the hazardous vehicle motion status.

12. The system according to claim 10, wherein the processor controls a vehicle safety system based on the hazardous vehicle motion status predicted.

13. The system according to claim 7, wherein the processor determines a lane curvature based on the preceding lane structure.

14. The system according to claim 13, wherein the processor compares the lane curvature to the vehicle dynamics to predict a hazardous vehicle motion status.

15. The system according to claim 14, wherein the processor generates a predicted vehicle motion alert based on the hazardous vehicle motion status.

16. The system according to claim 14, wherein the processor controls a vehicle safety system based on the hazardous vehicle motion status predicted.

17. The system according to claim 1, wherein the processor tightens seat belts by activating an electric pre-tensioner in response to a predicted lane departure based the longitudinal acceleration signal, the lateral acceleration signal, the yaw signal and the roll signal from the inertial sensor assembly and the preceding lane structure information from the imaging sensor.

18. A system for detecting departure of a vehicle from a lane on a road, the system comprising:
   a processor;
   an imaging sensor in electrical communication with the processor, the imaging sensor generating a vehicle position signal corresponding to the vehicle position relative to the lane and a preceding lane curvature corresponding to the lane in front of the vehicle;
   an inertial sensor assembly in electrical communication with the processor, the inertial sensor assembly generating a yaw signal, roll signal, and a pitch signal corresponding respectively to a yaw angle, roll angle, and pitch angle of the vehicle, the inertial sensor assembly generating a lateral acceleration signal, longitudinal acceleration signal, and a vertical acceleration signal corresponding respectively to a lateral acceleration, longitudinal acceleration, and vertical acceleration of the vehicle;
   wherein the longitudinal acceleration signal, the lateral acceleration signal, the vertical acceleration, the yaw signal and the roll signal from the inertial sensor assembly are used in conjunction with preceding lane structure information from the imaging sensor to predict departure from the lane.

19. The system according to claim 18, wherein the processor compares the lane curvature to a vehicle dynamics status to predict a hazardous vehicle motion status.

20. The system according to claim 19, wherein the processor generates a predicted vehicle motion alert based on the hazardous vehicle motion status.

21. The system according to claim 19, wherein the processor controls a vehicle safety system based on the hazardous vehicle motion status predicted.

22. The system according to claim 18, wherein the inertial sensor assembly comprises a plurality of accelerometers configured to generate the yaw signal, the roll signal, the pitch signal, the longitudinal acceleration signal, the lateral acceleration signal, and the vertical acceleration signal.

23. The system according to claim 17, wherein the processor tightens seat belts by activating an electric pre-tensioner in response to a predicted lane departure based the longitudinal acceleration signal, the lateral acceleration signal, the vertical acceleration signal, the yaw signal and the roll signal from the inertial sensor assembly and the preceding lane structure information from the imaging sensor.

* * * * *